(12) United States Patent
Bereznai

(10) Patent No.: US 7,175,154 B2
(45) Date of Patent: Feb. 13, 2007

(54) PISTON STRUCTURE AND LIQUID FEEDER VALVE

(76) Inventor: József Bereznai, Gát u. 8, H-1095, Budapest (HU)

( * ) Notice: Subject to any disclaimer, the term of this patent is extended or adjusted under 35 U.S.C. 154(b) by 43 days.

(21) Appl. No.: 10/491,754

(22) PCT Filed: Oct. 4, 2002

(86) PCT No.: PCT/HU02/00100

§ 371 (c)(1),
(2), (4) Date: Oct. 6, 2004

(87) PCT Pub. No.: WO03/031850

PCT Pub. Date: Apr. 17, 2003

(65) Prior Publication Data

US 2005/0035318 A1   Feb. 17, 2005

(30) Foreign Application Priority Data

Oct. 5, 2001   (HU) .................................. 0104144

(51) Int. Cl.
*F16J 15/16* (2006.01)
(52) U.S. Cl. ............................................. 251/22
(58) Field of Classification Search ............... 251/22; 92/182–185
See application file for complete search history.

(56) References Cited

U.S. PATENT DOCUMENTS

| | | | | | |
|---|---|---|---|---|---|
| 2,914,368 | A | * | 11/1959 | Farmer et al. ................. | 92/184 |
| 3,224,378 | A | | 12/1965 | Graham ......................... | 92/182 |
| 4,265,087 | A | * | 5/1981 | Peeples ......................... | 60/550 |
| 4,673,000 | A | * | 6/1987 | Haerr et al. ................. | 137/860 |
| 4,862,786 | A | * | 9/1989 | Boyer et al. .................. | 91/26 |
| 4,975,028 | A | * | 12/1990 | Schultz ......................... | 417/442 |
| 5,137,124 | A | * | 8/1992 | Wirges ......................... | 188/282.1 |
| 5,715,681 | A | * | 2/1998 | Williamson .................. | 60/585 |
| 6,089,575 | A | | 7/2000 | Ottersbach et al. | |

FOREIGN PATENT DOCUMENTS

| | | |
|---|---|---|
| DE | 20 18 994 | 11/1971 |
| DE | 42 10 578 A1 | 7/1992 |
| DE | 197 10 448 A1 | 10/1997 |
| GB | 2 311 584 A | 10/1997 |

* cited by examiner

*Primary Examiner*—J. Casimer Jacyna
(74) *Attorney, Agent, or Firm*—Morgan, Lewis & Bockius LLP

(57) ABSTRACT

Piston structure having a first side and a second side and in a recess (6) formed in an outer portion of the piston (1, 22) a resilient sealing element (5, 11, 21) is placed. The axial width and at least in some places the radial depth of the recess (6) are greater than the cross-sectional diameter of the sealing element (5, 11, 21) which is able to move, owing to the pressure difference of the two sides, between a first and a second position, thereby alternately ensuring a cumulated cross-sectional area at most A1, and a cross-sectional area A0, or a cumulated cross-sectional area at most A2, and a cross-sectional area A0. A1 and A2 are substantially smaller than A0. The invention further relates to a liquid feeder valve including this piston structure for allowing liquid flow-through in a certain amount or for a period of time from a pressurized source of liquid.

20 Claims, 4 Drawing Sheets

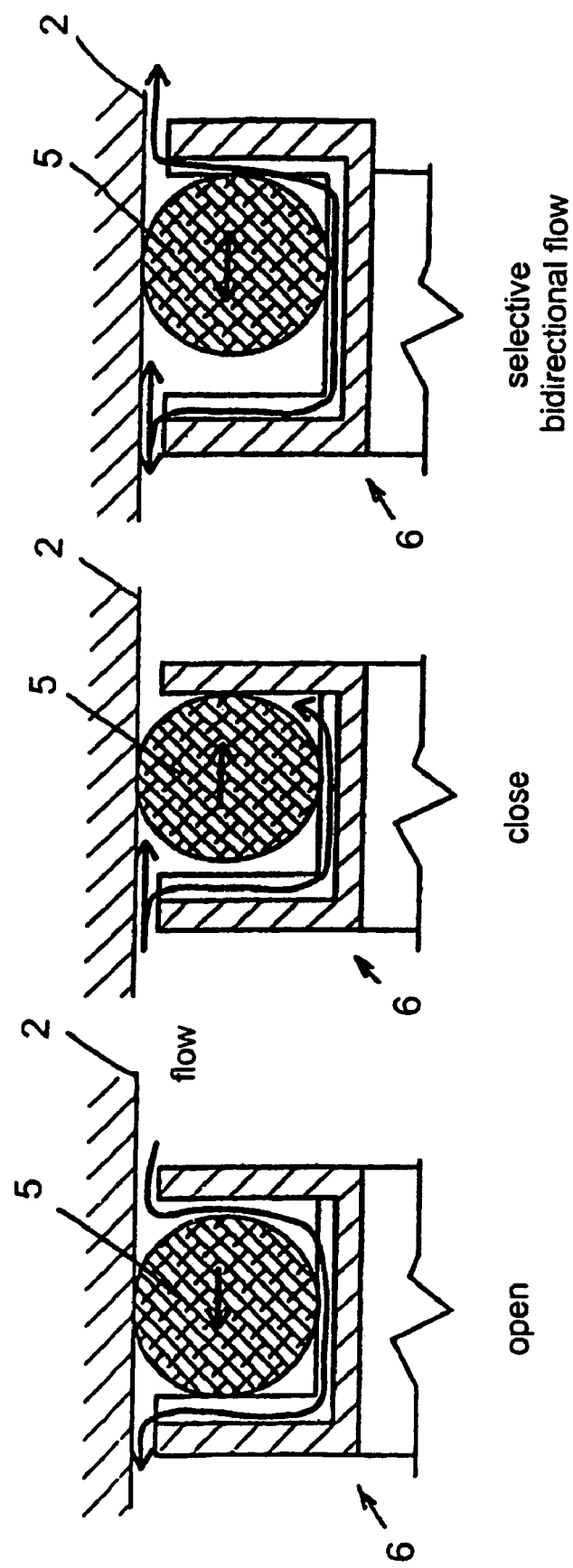

PISTON STRUCTURE AND LIQUID FEEDER VALVE

CROSS REFERENCE TO RELATED APPLICATIONS

This application is the National Stage of International Application No. PCT/HU02/00100 filed on Oct. 4, 2002, and thus claims the benefit of this filing date under 35 U.S.C. 371(c). This application further claims priority under 35. U.S.C. 119(a) and 365(b) to Hungary Patent Application No. P0104144 filed on Oct. 5, 2001, the priority of which was also claimed in the international stage of International Application No. PCT/HU02/00100.

BACKGROUND OF THE INVENTION

1. Field of the Invention

The invention relates to a piston structure for two-directional axial motion in a piston cylinder containing liquid, the piston structure has a first side facing a first chamber and a second side facing a second chamber, a piston-rod is attached to the first or the second side of the piston, and in a recess formed in an outer portion of the piston an O-ring made of a resilient material and having a given cross-sectional diameter is placed which seals the wall of the piston cylinder. The invention further relates to a liquid feeder valve for allowing liquid flow-through in a certain amount or for a period of time from a pressurized source of liquid.

2. Description of Related Art

In liquid systems, for example in water-pipe systems there is often need for enabling dosage of liquid in certain amounts or for a period of time. There are valves which can be used for this purpose, for example the so called "Shell-valves", such as water-closet flush valves. This application comprises a membrane and a relatively long and narrow conduit pipe with a cross-section of about 50 µm, which restricts the pressure of water and, by forming an auxiliary current, it blocks the flow path of the liquid after filling up a given volume. With use, the liquid flows through the thin passage in the same direction every time, and due to this, solid contaminants accidentally present in the liquid may choke up the narrow passage. In such case the valve must be disassembled and these contaminants can be removed from the conduit pipe by means of a thin wire pin which is after all a wearisome operation of maintenance.

U.S. Pat. No. 4,057,074 describes a valve design which is provided with an active piston displaceable in two directions. According to this description the design is operable even in case of great pressure differences existing between the two sides, by means of a spring used in one of the spaces of liquid. However, this element may in itself be a cause of failure.

BRIEF SUMMARY OF THE INVENTION

The aim of the present invention is to provide a simple, reliable piston and with this a feeder valve structure, which do not require maintenance, which are operable within wide-ranging limits, with which liquid flow-through can be stabilized or can be changed in time according to chosen characteristic and can be implemented at low cost.

It has been realized that:
  when using a piston which comprises a resilient sealing element placed in a domain of its edge where the sealing element is able to assume two different positions and move between them, different cross-section of flow can be provided, consequently different flow velocity can be obtained;
  the two positions can be correspondent to two different directions of flow, thereby for example removal of possible contaminants can be performed in a self-cleaning way.

To achieve the aim of the present invention, a piston structure mentioned in the introductory part is provided, wherein the axial width and at least in some places the radial depth of the recess formed in the outer portion of the piston are greater than the cross-sectional diameter of the O-ring, the O-ring is placed in the recess so that it is able to move, owing to the pressure difference between the first side and the second side, between a first position facing the first side and a second position facing the second side, and when the O-ring is in its first position the cumulated cross-sectional area of the flow path between the recess and the first side of the piston is A1, and the cross-sectional area of the flow path between the recess and the second side of the piston is A0, however, when the O-ring is in its second position the cumulated cross-sectional area of the flow path between the recess and the second side of the piston is A2, and the cross-sectional area of the flow path between the recess and the first side of the piston is A0, where the smaller of A1 and A2 is smaller than A0 by orders of magnitude.

In another embodiment, where the liquid flow-through is stabilized independently of the pressure fluctuation, in the piston structure mentioned in the introductory part, the flow path having a cumulated area A1 is made up of one or more openings in the form of radial scraping, grooving, ribbing or engraving in one or more places on the bearing area for the sealing element of the piston, which openings are narrowed down by the sealing element proportional to the pressure difference when the higher pressure present in the second chamber than in the first chamber deforms the sealing element elastically.

BRIEF DESCRIPTION OF THE DRAWINGS

The invention will be described with reference to the attached drawings where:

FIGS. 3A, 3B and 3C schematically show the cross-section of the sealing element and the recess of the piston according to the invention in different positions and implementation, in which the sealing element is an O-ring;

DETAILED DESCRIPTION OF THE PREFERRED EMBODIMENTS

Figure 1A:
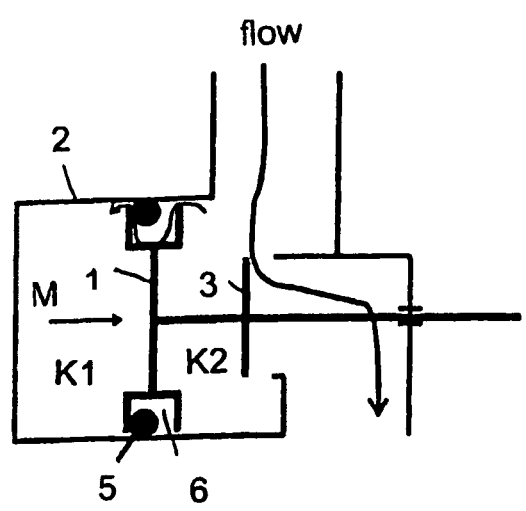
FIGS. 1A and 1B schematically show the principle of the liquid feeder valve according to the invention with two different directions of displacement.
Figure 2A:
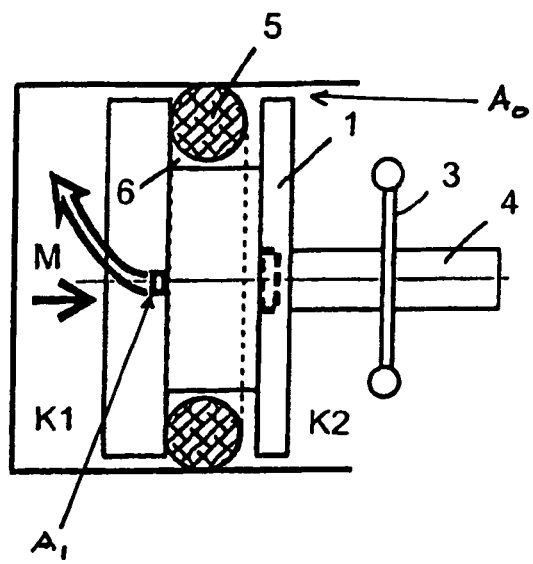
FIGS. 2A and 2B show the cross-section of the liquid feeder valve according to the invention with two different directions of displacement.
Figure 1B:
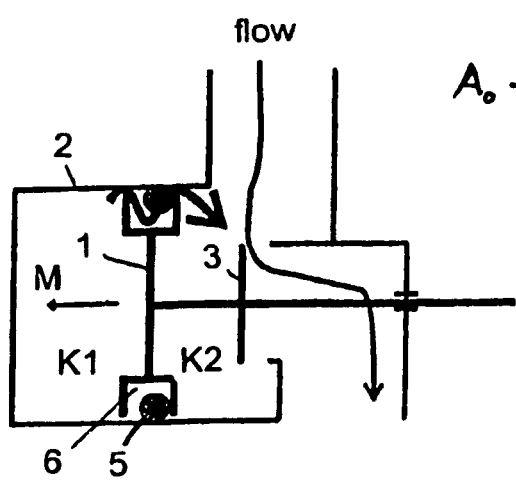
Figure 2B:
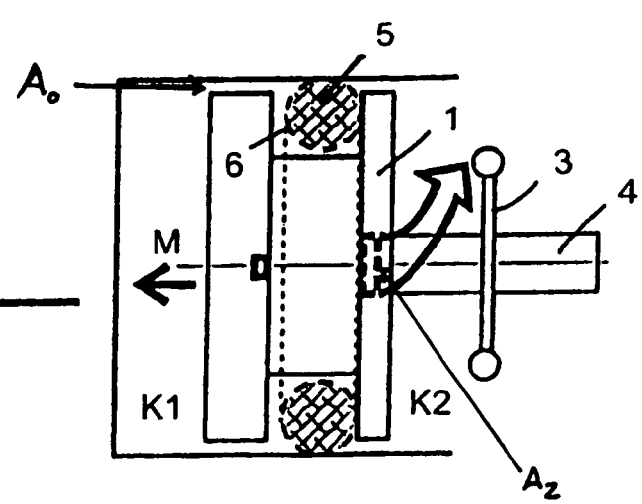

The piston structure shown in FIGS. 1A, 1B, 2A and 2B consists of a piston 1 movable in a piston cylinder 2 having circular cross-section, a piston shaft 4 mounted on piston 1, and an auxiliary piston 3 mounted on piston shaft 4. The arrow shows the direction of flow of the liquid when the auxiliary piston 3 is in open position. The closed space bordered by piston 1 forms a first chamber K1, while the space of liquid connected to the liquid system and intercommunicating the second side of piston 1 when auxiliary piston 3 is in open position, can be regarded as a second chamber K2, which may be of different pressure than first chamber K1. On an outer portion of piston 1, on its edge, a recess 6 is formed, which in FIGS. 1A and 1B is shown schematically, representing only its interior shape. In recess 6 a sealing element which in the present example is an O-ring 5 having a circular cross-section and made of a conventional resilient material is placed, the diameter of which is smaller than the axial width and at least in some places smaller than the radial depth of the recess 6. As a result of this, the O-ring 5 functioning as sealing is able to assume two different specific positions as a function of the difference between pressure prevailing in the first chamber K1 and second chamber K2 formed on the first side and second side of piston 1 respectively.

In both positions, the piston structure is permeable to liquid to a certain extent. It is assumed that in the first position of O-ring 5 the cumulated flow path between recess 6 and first side of piston 1 (the side on the left in FIGS. 1 and 2) has a cross-sectional area A1 determining liquid flow-through, and the cumulated flow-through between recess 6 and second side of piston 1 (the side on the right in FIGS. 1 and 2) has a cross-sectional area A2 in the second position. If hydraulic pressure is higher in second chamber K2, then O-ring 5 is in its first position, piston 1 moves in the direction of arrow M shown in FIG. 2A, and a gap having a cross-section corresponding to area A1 determines liquid flow-through, that is the rate of filling up of the first chamber K1, and through this the length of time until auxiliary piston 3 on piston shaft 4 closes free flow of liquid along the arrow indicating the direction of flow. By moving of piston shaft 4 in the opposite direction, the conditions of pressure difference between first chamber K1 and second chamber K2 will change, thereby in the second position of O-ring 5 (FIG. 2B), liquid being in the first chamber K1 can flow into second chamber K2 through a cross-sectional area A2. Unmarked symbolic arrows of FIGS. 1B and 2B by their having greater thickness than arrows of FIGS. 1A and 2A indicate the larger, more rapid liquid flow-through.

On activating piston 1 is enforced by a certain mechanism to move towards the first chamber K1. This mechanism can be a valve to run down liquid from the first chamber K1 to a space of lower pressure through either the piston 1 or the piston cylinder 2, or alternatively can be a direct mechanical mechanism for moving the piston shaft 4 which may be performed manually or by means of any other servo structure coupled to piston shaft 4 as required. In the example according to FIG. 2 area A2 is essentially larger than area A1, thereby it can be assured that in case of free liquid flow-through, the set timing well exceeds the time necessary for starting the feeder valve, that is, the time necessary for pushing piston shaft 4 up to a given point for example a point of "bump".

Independent of whether O-ring 5 employed as sealing element takes up its first or second position in recess 6 of piston 1, the measurement of piston 1 without sealing is such that cross-sectional cumulated flow-through corresponding to an area A0 is possible between the piston and the wall of the piston cylinder 2, and this cross-sectional area A0 is substantially larger than A1 and A2, or at least larger than the smaller of the two. In the present example A2 is larger than A1, and A0 may approximately be of the order of A2, since it does not increase the length of time being necessary for manual (mechanical) operation, for activation of the piston structure.

FIGS. 3A–3C are enlarged drawings of the wall of piston cylinder 2, the edge part of piston 1 in which recess 6 is formed, and the sealing element O-ring 5 placed in recess 6. In this preferred embodiment, the cross-sectional area A1 and A2 necessary for flow-through may be implemented by forming grooves either in the wall of recess 6 or in the surface of the O-ring 5. These grooves can be found both on the bottom part and side parts of recess 6 which has a rectangular cross-sectional profile. The dimensions (width and depth) of the grooves and also their denseness in the wall of the recess all together determine cross-sectional areas A1 and A2. The grooves can be formed by etching or they can be scratched in using a hard tool, the latter is simpler considering the difficulties in access of the inner surface of the recess. Displacement of O-ring 5 between its first and second position may take place substantially without friction in the environment filled with liquid, and, displacement is further promoted by allowance for measure. In FIG. 3B where O-ring 5 is in its second position, it locks up, since it leans against the flat wall of recess 6 which wall is at the second side (the right side in the Figure). In this case A2=0. In the case of FIG. 3C A1 is larger than A2, but, the latter is also larger than 0.

Figure 4A:
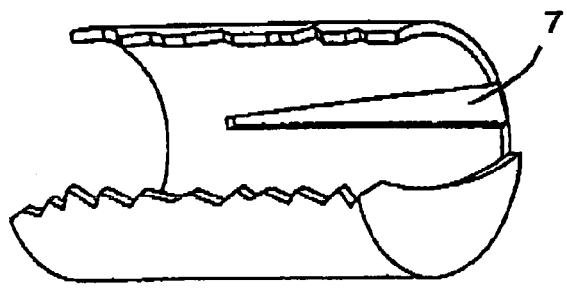
FIGS. 4A and 4B show two possible shaping of the recesses which are formed in the sidewall of the piston cylinder according to the invention for programmed flow.
Figure 4B:
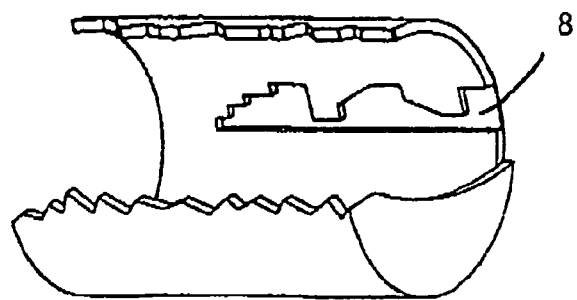

Flow operation of the feeder valve having a principal piston and an auxiliary piston shown in FIG. 2, that is, setting the characteristics of operation of the feeder valve in terms of time, can be done by choosing the cumulated measurements of the openings for flow-through (A1, A2), as well as by adjusting the opening point of auxiliary piston 3. It is easy to see that displacement of piston 1 means travelling of the sealing element along the inner wall of piston cylinder 2. This makes possible formation of the respective areas (A1 or A2) of openings for flow-through between the sealing element and the wall of the piston cylinder 2 instead of forming them between the sealing element and the wall of the recess 6, in this way ensuring flow-through in compliance with the instantaneous location of, displacement and thereby variable speed of piston 1. This may be needed for example when auxiliary piston 3 is moved in the vicinity of its closing or opening point, when significant braking effect is needed for damping—as much as possible—the "shock" occurring for example at the time of closing. It can be very important in case of liquid feeder valves used in industry, where respectable quantities of flow-through are needed and mechanical stress of the system would be greater without braking. This kind of accomplishment, that is, when area A1 is variable depending on the position of piston 1, may be assured by recesses 7, 8, as it is shown in FIG. 4. FIG. 4A illustrates recess 7 which provides a linearly decreasing cross-section, and FIG. 4B shows recess 8 by means of which the cross-section can be altered linearly as well as steplike (immediately), thereby realizing a peculiar characteristic of velocity in time.

Figure 5A:
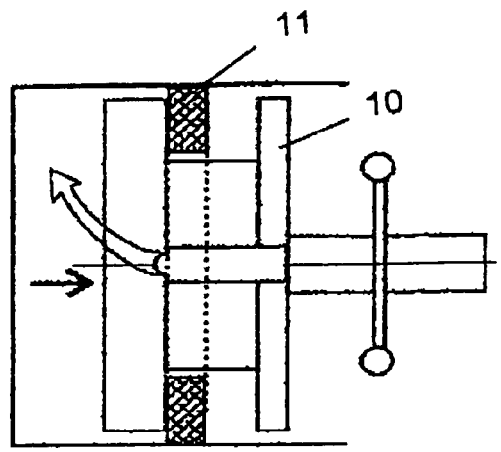
FIGS. 5A and 5B show in side elevation the piston of the liquid feeder valve of FIGS. 2A and 2B with two different directions of displacement, having a sealing element profiled differently in its cross-sectional view.
Figure 5B:
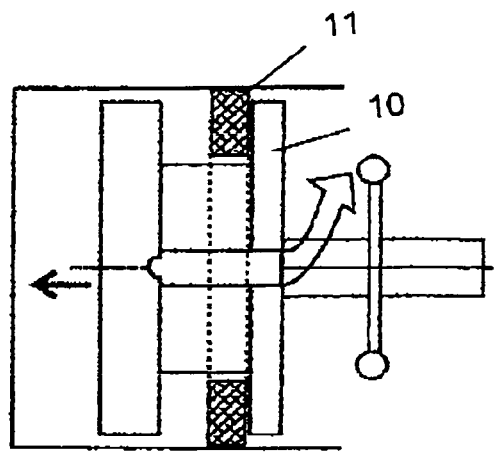

In FIGS. 5A and 5B two positions of sealing element 11 of piston 10 are shown respectively, illustrating the direction of liquid-flow and the direction of displacement M of the piston. This example shows that it is not necessary for sealing element 11 to be formed as O-ring, but other sealing having an annular cross-section can be used, which is suitable for assuring the required sealing by leaning against the wall of the recess and the wall of the piston cylinder. The arrows indicating the flow-through are shown at the line of the axis, in relation to this it should be noted that in the condition which makes more rapid flow-through possible, that is when area A2 is larger, the opening for flow-through between the second side of piston 10 and the recess may be also realized on other parts of the piston, for example by forming boreholes in the piston-body. These boreholes may connect the internal space of the recess and the second side of piston 10. The piston 10 illustrated in side elevation in FIG. 5A and FIG. 5B includes a radial U shaped groove 12, with a difference that the right side of the piston 10 is cut through along one leg of the U shape being transversal to the plane of drawing.

Figures 6A, 6B:
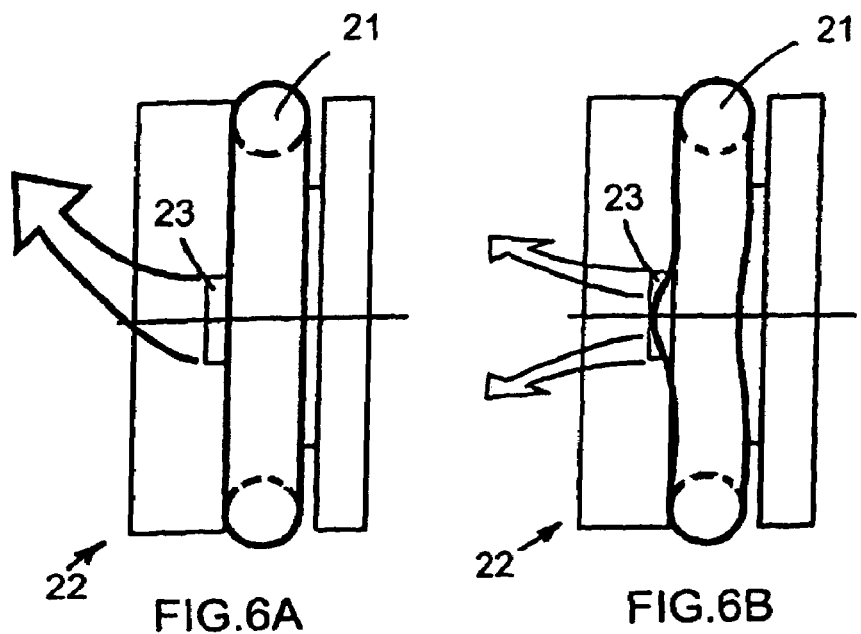
FIGS. 6A and 6B show the pressure equalizing flow-through regulating function of the sealing element of the piston according to the invention.

In the spirit of the present invention, built upon a common ground, there are further possibilities for constructing a piston structure in which the sealing element through its elastic deformation narrows down the opening for flow-through having an area A1 proportionately to the measure of pressure difference between the first side and the second side. The operation of this is shown in FIG. 6, where FIG. 6A illustrates the position of sealing element 21 which is by way of example realized as an O-ring. The sealing element 21 lies above opening 23 formed on an inner surface (looking onto the first side) of the recess of piston 22. This is the situation when pressures on the first side and on the second side substantially equal to each other or there is only a slight difference between them. However, in case of liquid systems with high pressure, it may occur that this difference is great. Then flow of liquid through opening 23 would be more rapid, which can be compensated by elastic deformation of the sealing element as shown in FIG. 6B, where a portion of the O-ring deflects thereby it narrows down the effective cross-section of opening 23. In this manner, by appropriate choosing of the size of opening 23 as well as the material of the sealing element 21, the narrowing down of the cross-section (performed in the interest of uniformity of flow-through measured during a unit of time) is directly proportional to the invert of flow velocity. This self-adjusting structure can be used also in case of valves where the piston does not perform reciprocating motion. Still, all these can result in useful side effects in case of liquid feeder valves performing two-directional motion, too.

In the liquid feeder valve structures like in FIGS. 1 and 2 it may be a problem to open the auxiliary piston 3 from its fully closed state. In case of high liquid pressure and large sizes the force caused by the pressure on the auxiliary piston 3 disables to open it with the piston shaft 4. It may be a considerable problem, especially in case of hand operated mode, but in case of applied servo machine reduction of the power need is also desirable. For this purpose the high pressure liquid can be run down from the closed space of first chamber K1 without displacing closed auxiliary piston 3. It can be achieved in different manners, all having the common feature that the high pressure liquid from first chamber K1 is getting to a space of lower pressure through either the piston 1 or the piston cylinder 2. In this case the area A2 is not relevant, it may be zero.

Figures 7A, 7B:
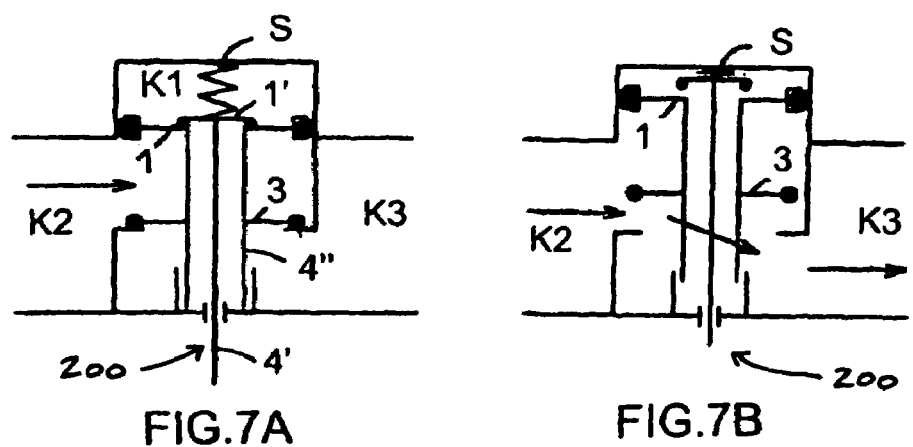
FIGS. 7A and 7B show a schematic structure of a further liquid feeder valve with push control.

In the arrangement of FIG. 7A a further control valve 1' is formed within the piston 1, which enables the liquid to flow from first chamber K1 to a low pressure space K3, which is a liquid outlet indeed. Control valve 1' can be opened by another piston shaft 4' which passes through the hollow body of piston shaft 4" connecting piston 1 to auxiliary piston 3. The piston shaft 4' can move independently from piston shaft 4". The control valve 1' of small area can be opened against tiny force, for example, by a push button mechanism (200). After release of pressure and run down liquid from the first chamber K1; the high pressure liquid in second chamber K2 will have the piston 1 moved toward the first chamber K1 during the opened period of control valve 1', and the main liquid stream flows into the space K3 as illustrated in FIG. 7B. A spring S is used to return control valve 1' into its closed state when the piston shaft 4' is released. Then the piston 1 together with auxiliary piston 3 will move in reverse direction at a speed dependent on area A1 until auxiliary piston 3 closes the main stream. The travel-path of the push button mechanism (200) can be limited to one or more given lengths or may be adjustable by means of a limiting mechanism variable by turning along a helical path. For example, the push-button travel-path may be adjustable by turning and with a push-button travel-path of which is limited to a fixed length.

Figures 8A, 8B:
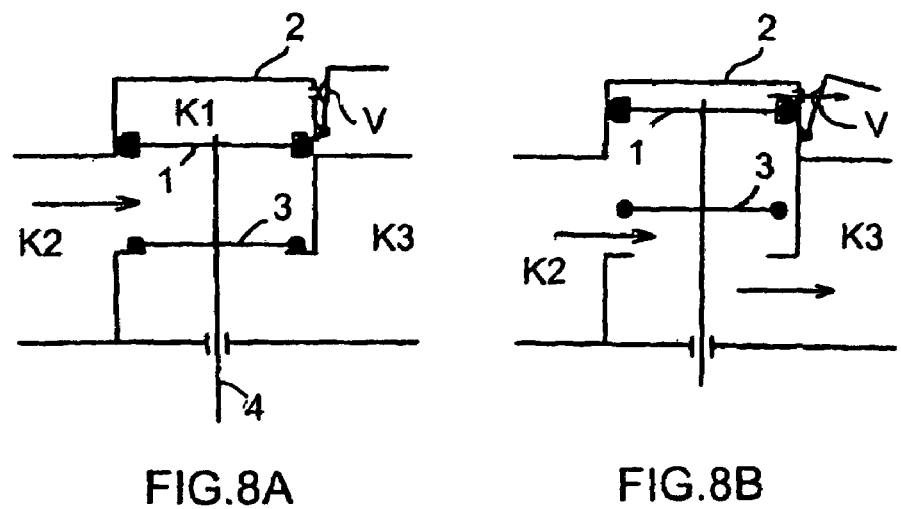
FIGS. 8A and 8B show a schematic structure of a further liquid feeder valve with a control valve in the wall of the first chamber.

In the arrangement of FIG. 8A a controllable valve V in the wall of piston cylinder 2 is used to release pressure and run down liquid from the first chamber K1. Opening and closing valve V provides a control corresponding to that of the control valve 1' described above, as illustrated also in FIG. 8B. The piston shaft 4 is different from the similar element of FIGS. 1 and 2 in that initiating and timing the main stream flow period is activated by valve V instead piston shaft 4 of FIG. 8, which requires a small power also in this case. The foregoing structures fundamentally concern liquids. However, it should be noted that by forming micro-sized radial scraping, grooving, ribbing or engraving on the bearing areas in one or more places, the components are able to perform the aforementioned asymmetrical operation in case of gases, for example in case of gaseous shock absorbers or dampers. Thus the invention can be used in connection with any fluid, either liquid or gaseous fluids. For instance, the liquid feeder valves can be a water-closet flush valve, a garden sprinkler valve or an industrial chemical valve.

A significant advantage of the present invention is that when it is used as valve, then two-directional operation results in self-cleaning, and there is no need for using complicated tools. For putting into practice, asymmetry (A1<<A2) is essential in terms of proportioning activation and required time of operation. Finally, on the one hand, the technique used makes it possible to realize a characteristic of flow-through which changes in time, on the other hand, it makes possible to keep this characteristic steady irrespective of the pressure fluctuation of the source.

The invention claimed is:

1. Piston structure for two-directional axial motion in a piston cylinder containing liquid or gaseous fluid, said piston structure has a first side facing a first chamber (K1) and a second side facing a second chamber (K2), a piston shaft (4) is attached to said first or second side of said piston (1), and in a recess formed in an outer portion of said piston (1) an O-ring (5) made of a resilient material and having a given cross-sectional diameter is placed which seals the wall of said piston cylinder (2), the axial width and at least in some places the radial depth of said recess (6) formed in the outer portion of said piston (1) are greater than the cross-sectional diameter of said O-ring (5), the O-ring (5) is placed in said recess (6) so that it is able to move owing to the pressure difference existing between the first side and the second side, between a first position facing the first side and a second position facing the second side, characterized in that, the outer portion of the piston and the wall of the piston cylinder define a first space adjacent the first side of the piston and a second space adjacent the second side of the piston such that the first space forms a first conduit having a first cross-sectional area for fluid flow between the first side of the piston and the recess and the second space forms a second conduit having a second cross-sectional area for fluid flow between the second side of the piston and the recess, and when said O-ring (5) is in its first position the cumulated cross-sectional area of a flow path between said recess (6) and the first side of said piston (1) is A1, and the cross-sectional area of a flow path between said recess (6) and the second side of said piston (1) is the second cross-sectional area of the second conduit, and when said O-ring (5) is in its second position the cumulated cross-sectional area of said flow path between said recess (6) and the second side of said piston (1) is A2, and the cross-sectional area of said flow path between said recess (6) and the first side of said piston (1) is the first cross-sectional area of the first conduit, where the smaller of A1 and A2 is smaller than the first cross-sectional area by orders of magnitude and smaller than the second cross-sectional area by orders of magnitude, and in the first and second position the direction of the possible liquid flow between first and second chambers (K1,K2) is opposite.

2. Piston structure according to claim 1 characterized in that A1 and A2 are different.

3. Piston structure according to claim 1, characterized in that said flow path in said recess (6) is realized by forming radial scraping, grooving, ribbing or engraving in one or more places on the bearing area of said O-ring (5).

4. Piston structure according to claim 1, characterized in that said flow path is realized by forming radial scraping, grooving, ribbing or engraving in one or more places of the bearing area of said O-ring itself.

5. Piston structure according to claim 1, characterized in that said O-ring (5) owing to the pressure difference existing between the first side and the second side, is able to become deformed and to bend into said flow path, thereby it is able to reduce the cumulated cross-sectional area A1 or A2 of said flow path proportional to the pressure difference.

6. Liquid feeder valve for allowing liquid flow-through in a certain amount or for a period of time from a pressurized source of liquid, characterized in that said feeder valve comprises the piston structure of claim 1, wherein said piston shaft (4,4") operates an auxiliary piston (3) installed in the main stream flow path of the liquid, said piston (1) is set in motion towards said first chamber (K1) by a driving mechanism, and said second chamber (K2) is coupled to a lower pressure space (K3) in the open state of said auxiliary piston (3).

7. Liquid feeder valve according to claim 6 characterized in that A2 is larger than A1 by orders of magnitude.

8. Liquid feeder valve according to claim 6, characterized in that, at least one of said areas A1 and A2 is chosen to be of such a size that braked closing of said piston (1) is assured.

9. Liquid feeder valve according to claim 8, characterized in that when said piston (1) moves in two directions, the degree of braking of said piston (1) at the time of closing is different.

10. Liquid feeder valve according to claim 6, characterized in that said driving mechanism is a push-button mechanism whose travel-path is limited to a given length.

11. Liquid feeder valve according to claim 6, characterized in that said driving mechanism is a push-button mechanism whose travel-path can be limited to several given lengths.

12. Liquid feeder valve according to claim 10, characterized in that limitation of said travel-path of the push-button is adjustable by means of a limiting mechanism variable by turning along a helical path.

13. Liquid feeder valve according to claim 12 characterized in that it is at least provided with a push-button travel-path of which is adjustable by turning and with a push-button travel-path of which is limited to a fixed length.

14. The liquid feeder valve of claim 6, wherein the liquid feeder valve is a water closet flush valve.

15. The liquid feeder valve of claim 6, wherein the liquid feeder valve is an industrial chemical valve.

16. The liquid feeder valve of claim 6, wherein the liquid feeder valve is a garden sprinkler valve.

17. A piston structure for two-directional axial motion in a piston cylinder comprising:
a piston cylinder having an inner surface for housing the piston and containing operating fluid;
a piston disposed in the piston cylinder having
a first face such that the first face and the inner surface form a first chamber in the piston cylinder,
a second face such that the second face and the inner surface form a second chamber in the piston cylinder, and
a side surface extending from the first face to the second face, the side surface including an outer portion having first and second side walls spaced from each other by a first distance, and a bottom surface adjacent the first and second side walls, the bottom surface and the outer portion defining a second distance such that the first and second side walls and bottom surface form a recess in the side surface,
the outer portion of the piston and the inner surface of the piston cylinder defining
a first space adjacent the first face such that the first space forms a first conduit for fluid flow between the first chamber and the recess along a first flow path, the first space having a first cross section transverse to the first flow path, and
a second space adjacent the second face such that the second space forms a second conduit for fluid flow between the second chamber and the recess along a second flow path, the second space having a second cross section transverse to the second flow path, the second cross section and the first cross section each having a first area;
a third conduit connecting the recess and the first chamber along a third flow path, the third conduit having a third cross section transverse to the third flow path, the third cross section having a second area less than the first area, and
a fourth conduit connecting the recess and the second chamber along a fourth flow path, the fourth conduit having a fourth cross section transverse to the fourth flow path, the fourth cross section having a third area less than the first area; and
a resilient member with a cross-section having an outer dimension less than the first distance and less than the second distance, the resilient member being disposed in the recess proximate the inner surface of the piston cylinder such that the resilient member is movable within the recess between first and second positions owing to differences in fluid pressure existing between the first chamber and the second chamber such that
in the first position the resilient member allows fluid flow from the second chamber to the recess along the second flow path, blocks fluid flow from the recess to the first space along the first flow path, and allows fluid flow from the third conduit to the first chamber along the third flow path, and in the second position the resilient member allows fluid flow from the first chamber to the recess along the first flow path, blocks fluid flow from the recess to the second space along the second flow path, and allows fluid flow from the fourth conduit to the second chamber along the fourth flow path.

18. The piston structure of claim 17, wherein the second area is greater than the third area by at least about one order of magnitude.

19. The piston structure of claim 17, further comprising a first groove in the bottom surface, a second groove in the first side wall and third groove in the second side wall, wherein the third conduit comprises the first and second grooves and the fourth conduit comprises the first, second and third grooves.

20. The piston structure of claim 17 wherein the third conduit comprises at least one first bore-hole extending between the first side wall and the first face and fourth conduit comprises at least one second bore-hole extending between the second side wall and the second face.

* * * * *